United States Patent [19]

Yashiki et al.

[11] Patent Number: 4,783,743
[45] Date of Patent: Nov. 8, 1988

[54] IMPROVED APPARATUS FOR DETERMINING WHETHER GEAR-SHIFTING IN AN AUTOMATIC TRANSMISSION CONTROL SYSTEM IS IN PROCESS OR HAS BEEN COMPLETED

[75] Inventors: Seiji Yashiki; Haruki Higashi; Kouichirou Waki; Toshiyuki Kikuchi, all of Hiroshima, Japan

[73] Assignee: Mazda Motor Corporation, Japan

[21] Appl. No.: 808,172

[22] Filed: Dec. 12, 1985

[30] Foreign Application Priority Data

Dec. 18, 1984 [JP] Japan ................... 59-267209

[51] Int. Cl.$^4$ ............... B60K 41/08; G06F 15/20
[52] U.S. Cl. ................. 364/424.1; 192/.052; 74/752 D; 74/867
[58] Field of Search ............... 364/424, 424.1; 74/866, 74/867, 868, 752 A, 752 D; 192/3.31, 3.3, 3.57, 0.052, 0.076

[56] References Cited

U.S. PATENT DOCUMENTS

| | | | |
|---|---|---|---|
| 3,942,393 | 3/1976 | Forster et al. | 74/867 |
| 4,155,277 | 5/1979 | Monami et al. | 74/867 |
| 4,172,505 | 10/1979 | Rabus et al. | 74/752 D |
| 4,335,428 | 6/1982 | Miki et al. | 364/424.1 |
| 4,361,060 | 11/1982 | Smyth | 364/424.1 |
| 4,393,467 | 7/1983 | Miki et al. | 364/424.1 |
| 4,445,401 | 5/1984 | Ishimaru | 74/867 |
| 4,468,988 | 9/1984 | Hiramatsu | 74/868 |
| 4,495,576 | 1/1985 | Ito | 364/424.1 |
| 4,618,041 | 10/1986 | Sotoyama et al. | 192/0.052 |

*Primary Examiner*—Parshotam S. Lall
*Attorney, Agent, or Firm*—Gerald J. Ferguson, Jr.

[57] ABSTRACT

In an automatic transmission control system, completion of gear-shifting is detected on the basis of both the rate of change in rotational speed of the output shaft of the torque converter and the rotational speed at which the output shaft of the torque converter is expected to rotate. That is, a rotational speed range within which the rotational speed of the output shaft of the torque converter is expected to fall upon completion of the gear-shifting is determined taking into account the rotational speed of the output shaft of the torque converter upon initiation of the gear-shifting and the gear ratio, and it is determined that the gear-shifting is completed when the rotational speed of the output shaft of the torque converter falls within the predetermined rotational speed range and the rate of change in rotational speed of the output shaft of the torque converter is reduced below a predetermined value.

16 Claims, 11 Drawing Sheets

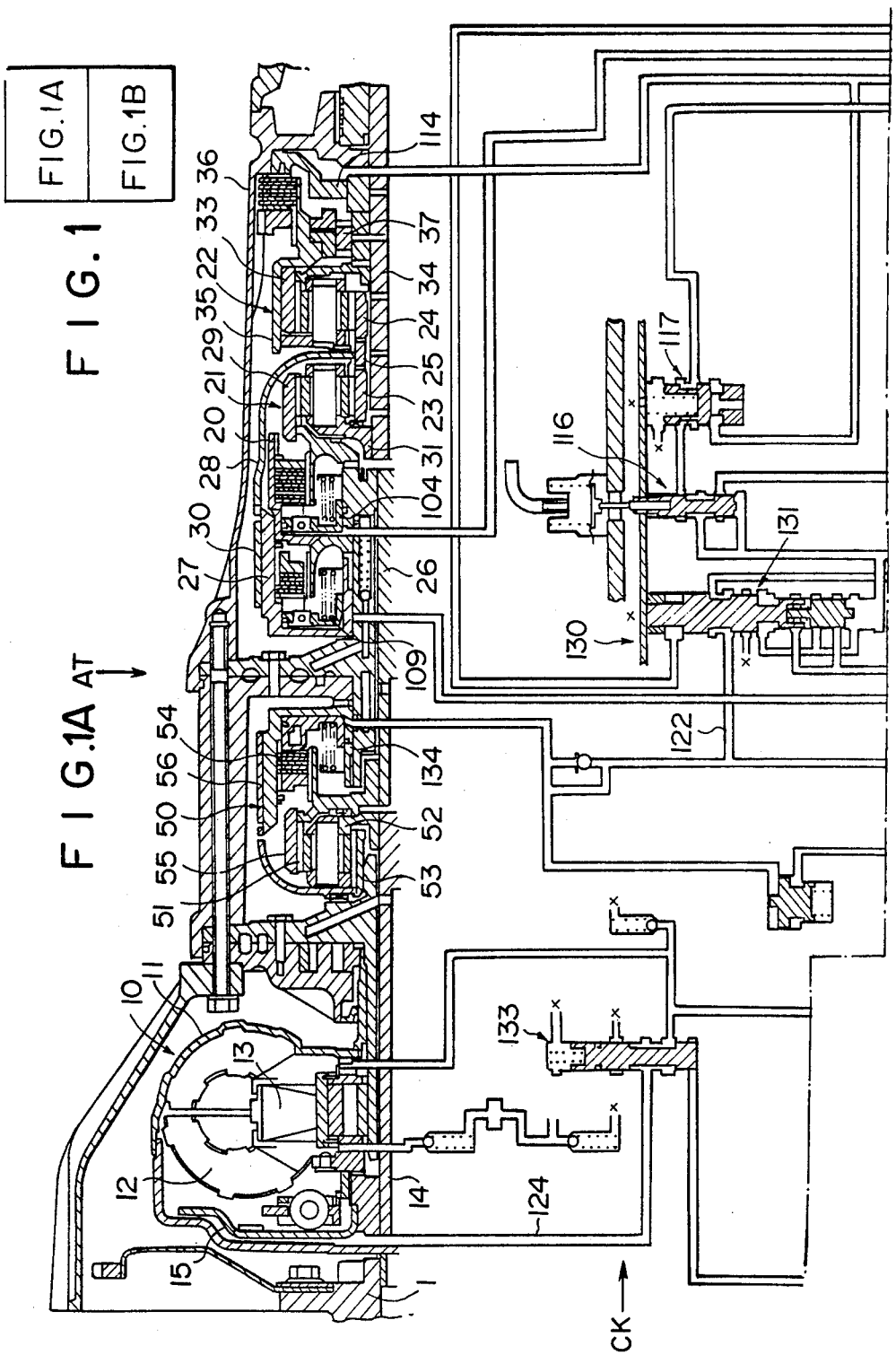

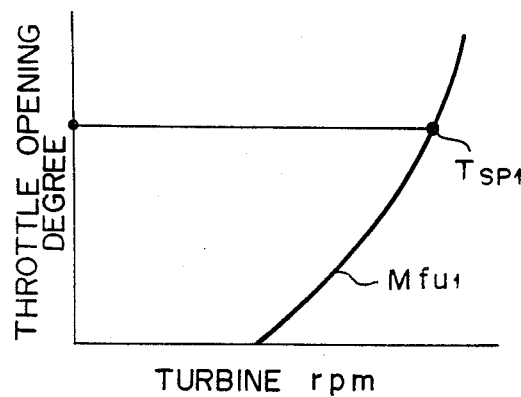
F I G. 6
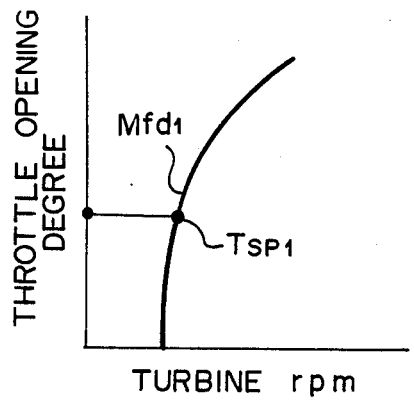
F I G. 8
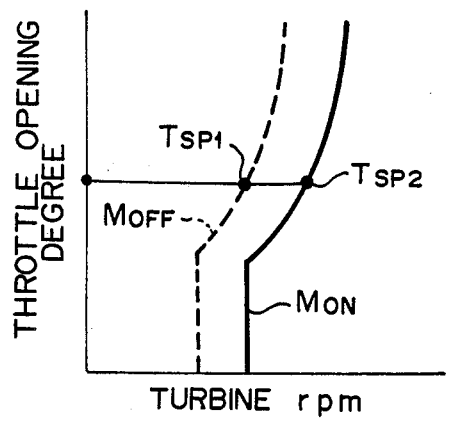
F I G. 10

4,783,743

IMPROVED APPARATUS FOR DETERMINING WHETHER GEAR-SHIFTING IN AN AUTOMATIC TRANSMISSION CONTROL SYSTEM IS IN PROCESS OR HAS BEEN COMPLETED

BACKGROUND OF THE INVENTION

1. Field of the Invention

This invention relates to an automatic transmission control system.

2. Description of the Prior Art

An automatic transmission for a vehicle generally comprises a torque converter and a transmission gear mechanism such as a planetary-gear train as two basic parts. In the automatic transmission, gear-shifting is generally done by a hydraulic mechanism and the hydraulic circuit is switched by solenoid valves so that the frictional elements such as a brake or a clutch are properly operated to change the power train to shift the transmission to a desired gear. In order to switch the hydraulic circuit by the solenoid valves, that the running state of the vehicle has crossed a predetermined gear-shifting property line is generally detected by an electronic control device and the solenoid valves are selectively operated according to an upshifting signal or a downshifting signal output from the electronic control device.

In such automatic transmissions, whether or not gear-shifting is completed must be sometimes detected. That is, since slip of the torque converter cannot be avoided, there is generally provided a lockup mechanism for directly connecting the engine output shaft and the output shaft of the torque converter for the purpose of improving fuel economy, for instance. The lockup mechanism is applied and released by controlling the hydraulic pressure fed to the fluid actuators associated with the lockup mechanism according to a lockup signal or a lockup-release signal output from the electronic control device on the basis of predetermined lockup control characteristics.

If gear-shifting is effected while the lockup mechanism is applied, a large shock occurs. Therefore, as disclosed in U.S. Pat. No. 4,393,467, the lockup mechanism is generally released when the gear-shifting is to be effected so that torque fluctuation generated upon the gear-shifting is absorbed by the torque converter. Further, when downshift takes place, the driving load of the frictional engagement elements is increased, and the line pressure for engaging the engagement elements must be increased. The line pressure must be increased (backup) after completion of the downshift in order to avoid gear-shifting shock. Therefore, whether or not the gear-shifting is completed must be accurately detected.

Conventionally, this detection has been effected by detecting the rate of change in rotational speed of the torque converter based on the fact that the rate of change in rotational speed of the torque converter is large during gear-shifting as disclosed in U.S. Pat. No. 4,468,988. That is, when the rate of change is reduced below a predetermined value, it is determined that the gear-shifting has been completed.

However, the rate of change in rotational speed of the torque converter does not always change linearly. For example, though the rotational speed of the output shaft of the torque converter tends to be reduced by a large amount upon upshifting, the reduction is not always linear with sometimes the rotational speed being further reduced by a large amount after the reducing tendency has weakened. Therefore, if detection of whether the gear-shifting is completed depends solely upon the rate of change in the rotational speed of the torque converter, there is a possibility that it will be determined that gear-sifting is completed when the reducing tendency is weakened. If said predetermined value is minimized to avoid such problems, it becomes very difficult to distinguish change in rotational speed of the torque converter during the gear-shifting from that during other operating conditions.

SUMMARY OF THE INVENTION

In view of the foregoing observations and description, the primary object of the present invention is to provide an automatic transmission control system in which whether gear-shifting is completed can be accurately detected.

In accordance with the present invention, completion of gear-shifting is detected on the basis of both the rate of change in rotational speed of the output shaft of the torque converter and the rotational speed at which the output shaft of the torque converter is expected to rotate. That is, a rotational speed range within which the rotational speed of the output shaft of the torque converter is expected to fall upon completion of the gear-shifting is determined taking into account the rotational speed of the output shaft of the torque converter upon initiation of the gear-shifting and the gear ratio, and it is determined that the gear-shifting is completed when the rotational speed of the output shaft of the torque converter falls within the predetermined rotational speed range and the rate of change in rotational speed of the output shaft of the torque converter is reduced below a predetermined value.

Thus in the automatic transmission control system in accordance with the present invention, it is not determined that the gear-shifting is completed until the rotational speed of the output shaft of the torque converter falls within the predetermined rotational speed range even if the rate of change in rotational speed of the output shaft of the torque converter is reduced below the predetermined value. For example, even if the reducing tendency of the rotational speed of the output shaft of the torque converter is weakened and the rate of change in rotational speed of the output shaft of the torque converter is reduced below the predetermined value, it is not determined that the gear-shifting is completed until the rotational speed of the output shaft of the torque converter is reduced to within the predetermined rotational speed range within which it is expected to fall upon completion of the upshifting. On the other hand, even if the rotational speed of the output shaft of the torque converter is reduced to within the predetermined rotational speed range, it is not determined that the gear-shifting is completed until the rate of change in rotational speed of the output shaft of the torque converter is reduced below the predetermined value. Thus, accuracy in detecting completion of gear-shifting is increased. The width of the predetermined rotational speed range is determined to be as narrow as possible within a range in which the deviation of the actual rotational speed of the torque converter after completion of the gear shifting from the calculated value of the rotational speed of the output shaft of the torque converter at which the output shaft of the torque converter is expected to rotate after completion of the gear-shifting taking into the account the gear ratio can be accommodated.

BRIEF DESCRIPTION OF THE DRAWINGS

FIGS. 1, 1A and 1B constitute a view showing a hydraulic circuit of an example of an automatic transmission to be controlled by an automatic transmission control system of the present invention, FIG. 6 is a view showing an example of an upshift map, FIG. 8 is a view showing an example of a downshift map, FIG. 10 is a view showing an example of a lockup map.

DESCRIPTION OF THE PREFERRED EMBODIMENT

Figure 1B:
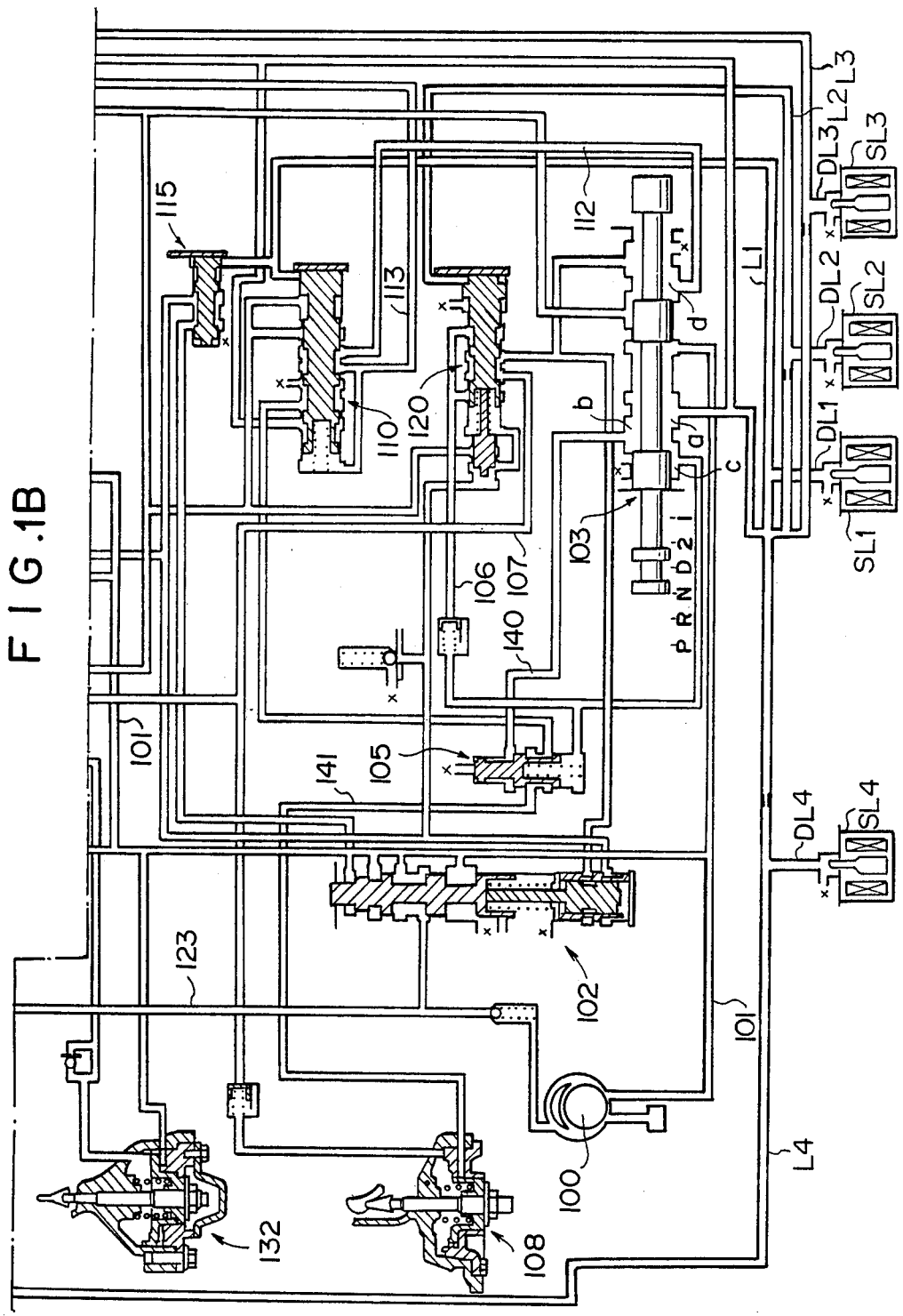

In FIG. 1, an automatic transmission AT comprises a torque converter 10, a multiple-speed transmission gear mechanism 20 and an overdrive planetary gear train 50 disposed between the torque converter 10 and the transmission gear mechanism 20.

The torque converter 10 comprises a pump 11 connected to the engine output shaft 1, a turbine 12 opposed to the pump 11 and a stator 13 disposed between the pump 11 and the turbine 12. A converter output shaft 14 is connected to the turbine 12. A lockup clutch 15 is provided between the converter output shaft 14 and the pump 11. The lockup·clutch 15 is urged, by working oil pressure circulating in the torque converter 10, toward a lockup position in which it locks the engine output shaft 1 to the converter output shaft 14, and is held, by releasing oil pressure fed from the outside, in a releasing position in which it releases the engine output shaft 1 from the converter output shaft 14.

The transmission gear mechanism 20 comprises a front stage planetary gear train 21 and a rear stage planetary gear train 22. Sun gears 23 and 24 of the front stage planetary gear train and the rear stage planetary gear train are connected with each other by a connecting shaft 25. The input shaft 26 of the transmission gear mechanism 20 is connecting to the connecting shaft 25 by way of a front clutch 27 and to an internal gear 29 of the front stage planetary gear train 21 by way of a rear clutch 28. Between the transmission casing and the connecting shaft 25, i.e., between the transmission casing and the sun gears 23 and 24, is provided a front brake 30. A planetary carrier 31 of the front stage planetary gear train 21 and an internal gear 33 of the rear stage planetary gear train 22 are connected to an output shaft 34. A rear brake 36 and a one-way clutch 37 are disposed between a planetary carrier 35 and the transmission casing.

In the overdrive planetary gear train 50, a planetary carrier 52 for supporting planetary gears 52 for rotation is connected to the converter output shaft 14, and a sun gear 53 is connected to an internal gear 55 by way of a direct drive clutch 54. An overdrive brake 56 is provided between the transmission casing and the sun gear 53, and the internal gear 55 is connected to the input shaft 26 of the transmission gear mechanism 20.

The transmission gear mechanism 20 is of a known type and by controlling the clutches 27 and 28 and brakes 30 and 36 in a known manner, the transmission gear mechanism 20 provides three forward speeds and one reverse. In the overdrive planetary gear train 50, the converter output shaft 14 and the input shaft 26 of the transmission gear mechanism 20 are locked together when the direct drive clutch 54 is engaged and the overdrive brake 56 is released, and are connected in the overdrive connection when the direct drive clutch 54 is disengaged and the overdrive brake 56 is applied.

The automatic transmission AT is provided with a hydraulic control circuit CK. The hydraulic control circuit CK is provided with an oil pump 100 driven by the engine output shaft 1. The working oil discharged from the oil pump 100 into a pressure line 101 is introduced into a selector valve 103 after its pressure is regulated by a regulator valve 102. The selector valve 103 selectively takes first gear position, second gear position, drive position, neutral position, reverse position and parking position respectively indicated at 1, 2, D, N, R and P in FIG. 1. When the selector valve 103 is in 1, 2 or D, the pressure line 101 is connected to ports a, b and c of the selector valve 103. The port a is connected to a rear-clutch actuator 104 for actuating the rear clutch 28, and when the selector valve 103 is in 1, 2 or D, the rear clutch 28 is kept engaged. The port a is further connected to a 1-2 shift valve 110 at a portion near the left side end of the 1-2 shift valve 110 so that the spool of the valve 110 is urged rightward. Further, the port a is connected to the right side end of the 1-2 shift valve 110, and right side end of a 2-3 shift valve 120 and the right side end of a 3-4 shift valve 130 respectively by way of first to third lines L1 to L3.

First to third drain lines DL1, DL2 and DL3 branch off respectively from the first to third lines L1 to L3. First to third solenoid valves SL1, SL2 and SL3 are provided to respectively open and close the first to third drain lines DL1 to DL3. The solenoid valves SL1 to SL3 respectively close the first to third drain lines DL1 and DL3 to increase the oil pressure in the first to third lines L1 and L3 when they are de-energized while the pressure line 101 is communicated with the port a.

The port d of the selector valve 103 is connected to a second lock valve 105 by way of a line 140 so that the pressure at the port b acts on the spool of the second lock valve 105 to push the spool downward. When the spool of the second lock valve 105 is in a lower position, the line 140 is communicated with a line 141 so that oil pressure is introduced into an applying side pressure chamber of an actuator 108 of the front brake 30 to hold the front brake 30 in its operative position. The part c of the selector valve 103 is connected to the second lock valve 105 so that the pressure at the port c acts on the spool of the second lock valve 105 to push the spool upward. Further, the port c is connected to the 2-3 shift valve 120 by way of a pressure line 106. The pressure line 106 is communicated with a line 107 when the solenoid valve SL2 in the second drain line DL2 is de-energized to increase the pressure in the second line L2 and the spool of the 2-3 shift valve 120 is moved leftward by the increased pressure in the second line L2. The line 107 is connected to a release side pressure chamber of the actuator 108 of the front brake 30. The actuator 108 moves the front brake 30 to a releasing position, overcoming the pressure in the applying side pressure chamber when oil pressure is introduced into the releasing side pressure chamber. The pressure in the line 107 is further introduced into an actuator of the front clutch 27 to engage the front clutch 27.

The selector valve 103 is further provided with a port d which is communicated with the pressure line 101 when the selector valve 103 in 1. The port d is communicated with the 1-2 shift valve 110 by way of a line 112 and is further communicated with an actuator 114 of the rear brake 36 by way of a line 113. The 1-2 shift valve 110 and the 2-3 shift valve 120 move their respective spools to switch lines upon de-energization of the first and second solenoid valves SL1 and SL2 so that the corresponding brakes and clutches are operated in a desired manner to effect 1-2 shift or 2-3 shift. Further the hydraulic control circuit CK is further provided with a cutback valve 115 for regulating oil pressure from the regulator valve 102, a vacuum throttle valve 116 for changing the line pressure from the regulator valve 102 according to the intake vacuum, and a throttle backup valve 117 for backing up the vacuum throttle valve 116.

The hydraulic control circuit CK is further provided with a 3-4 shift valve 130 and an actuator 132 for controlling the clutch 54 and the brake 56 of the overdrive planetary gear train 50. An applying side pressure chamber of the actuator 132 is connected to the pressure line 101 and the overdrive brake 56 is urged toward its applied position by the pressure in the pressure line 101. When the third solenoid valve SL3 is de-energized, a spool 131 of the 3-4 shift valve 130 is moved downward to interrupt communication between the pressure line 101 and a line 122 and to drain the line 122. This removes the oil pressure acting on a releasing side pressure chamber of the actuator 132 of the overdrive brake 56, whereby the overdrive brake 56 is moved to its applied position and at the same time an actuator 134 of the direct drive clutch 54 is caused to disengage the direct drive clutch 54.

The hydraulic control circuit CK is further provided with a lockup control valve 133 which is connected to the port a of the selector valve 103 by way of a line L4. A drain line DL4 provided with a fourth solenoid valve SL4 branches off from the line L4. When the fourth solenoid valve SL4 is energized to close the drain line DL4 and the pressure in the line L4 is increased, a spool of the lockup control valve 133 interrupts communication between lines 123 and 124 so that the line 124 is drained and the lockup clutch 15 is moved to its applied position.

Table 1 shows the relation between the respective speeds and the condition of the first to third solenoid valves SL1 to SL3. Table 2 shows the relation between whether the lockup is applied or released and the condition of the fourth solenoid SL4, and table 3 shows the relation between the respective speeds and the condition of the clutches and brakes.

TABLE 1

| speed | SL1 | SL2 | SL3 |
|---|---|---|---|
| 1 | ON | ON | ON |
| 2 | OFF | ON | ON |
| 3 | OFF | OFF | ON |
| 4 | OFF | OFF | OFF |

TABLE 2

| SL4 | lockup |
|---|---|
| ON | applied |
| OFF | released |

TABLE 3

|   | CL28 | CL27 | CL15 | CL54 | BR36 | BR30 | BR56 | CL37 | gear ratio |
|---|---|---|---|---|---|---|---|---|---|
| P |  |  |  | AP |  |  |  |  |  |
| R |  | AP |  | AP | AP |  |  |  | 2.181 |
| N |  |  |  | AP |  |  |  |  |  |
| <u>D</u> |  |  |  |  |  |  |  |  |  |
| 1 | AP |  |  | AP |  |  |  | AP | 2.458 |
| 2 | AP |  | (AP) | AP |  | AP |  |  | 1.458 |
| 3 | AP | AP | (AP) | AP |  |  |  |  | 1.000 |
| OD | AP | AP | (AP) |  |  |  | AP |  | 0.685 |
| 2 | AP |  |  | AP |  | AP |  |  | 1.458 |
| <u>1</u> |  |  |  |  |  |  |  |  |  |
| 1 | AP |  |  | AP | AP |  |  |  | 2.458 |
| 2 | AP |  |  | AP |  | AP |  |  | 1.458 |

**CL ... clutch (e.g. CL28 ... clutch 28) BR ... brake (e.g. BR36 ... brake 36) AP ... applied An automatic transmission control system in accordance with an embodiment of the present invention which controls the hydraulic control circuit CK to control the automatic transmission AT described above will be described in detail with reference to FIG. 2 which shows an engine EN provided with the automatic transmission AT.

Figure 2:
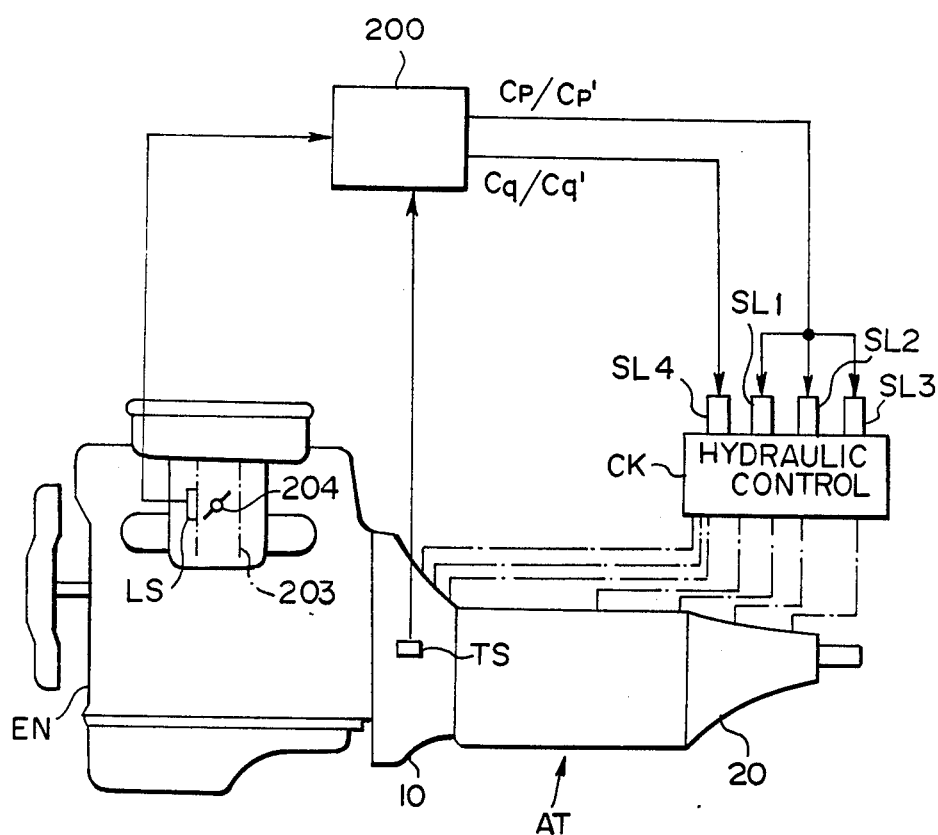
FIG. 2 is a schematic view showing an automatic transmission control system in accordance with an embodiment of the present invention.

In FIG. 2, a control unit 200 includes a lockup control circuit and a gear-shifting control circuit. A turbine rpm sensor TS detects the rpm of the output shaft 14 of the torque converter 10 or the turbine rpm Tsp, and an engine load sensor LS detects the opening degree TH of a throttle valve 204 disposed in an intake passage 203 of the engine EN. Output signals of the sensors TS and LS are input into the control unit 200.

The turbine rpm Tsp and the throttle opening degree TH are dealt with as information representing the vehicle speed and the engine speed.

Figure 3:
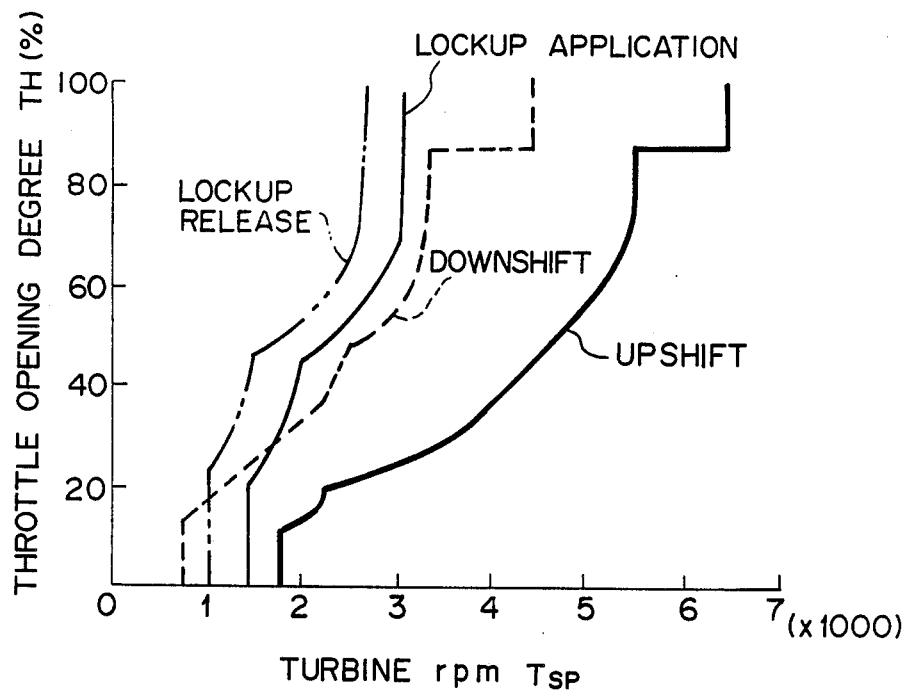
FIG. 3 is a view showing an example of a gear-shifting map.

The gear-shifting control circuit of the control unit 200 determines whether or not gear-shifting is to be effected by referring to the turbine rpm signal from the turbine rpm sensor TS, the throttle opening degree signal from the engine load sensor LS and information from a running mode sensor (not shown) to a downshifting curve or an upshifting curve shown in FIG. 3 which are predetermined based on turbine rpm-engine load characteristics. According to the determination, the gear-shifting control circuit delivers an upshifting signal Cp or a downshifting signal Cp' to the first to third solenoid valves SL1, SL2 and SL3 of the hydraulic control circuit CK to selectively energize them in the manner shown in Table 1 so that the desired upshifting or downshifting is effected. The gear-shifting control circuit further delivers the upshifting signal Cp or the downshifting signal Cp' to the lockup control circuit.

The lockup control circuit of the control unit 200 determines whether the lockup is applied or released by referring to the turbine rpm signal from the turbine rpm sensor TS, the throttle opening degree signal from the engine load sensor LS and information from a running mode sensor (not shown) to a lockup applying curve or a lockup releasing curve shown in FIG. 3 which are predetermined based on turbine rpm-engine load characteristics. According to the determination, the lockup control circuit delivers a lockup signal Cq or lockup-release signal Cq' to the fourth solenoid valve SL4.

The control unit 200 may be a microcomputer. When the control unit 200 is formed by a microcomputer, the operation of the microcomputer is accomplished according to the flow charts shown in FIGS. 5 to 10.

General Control

Figure 4:
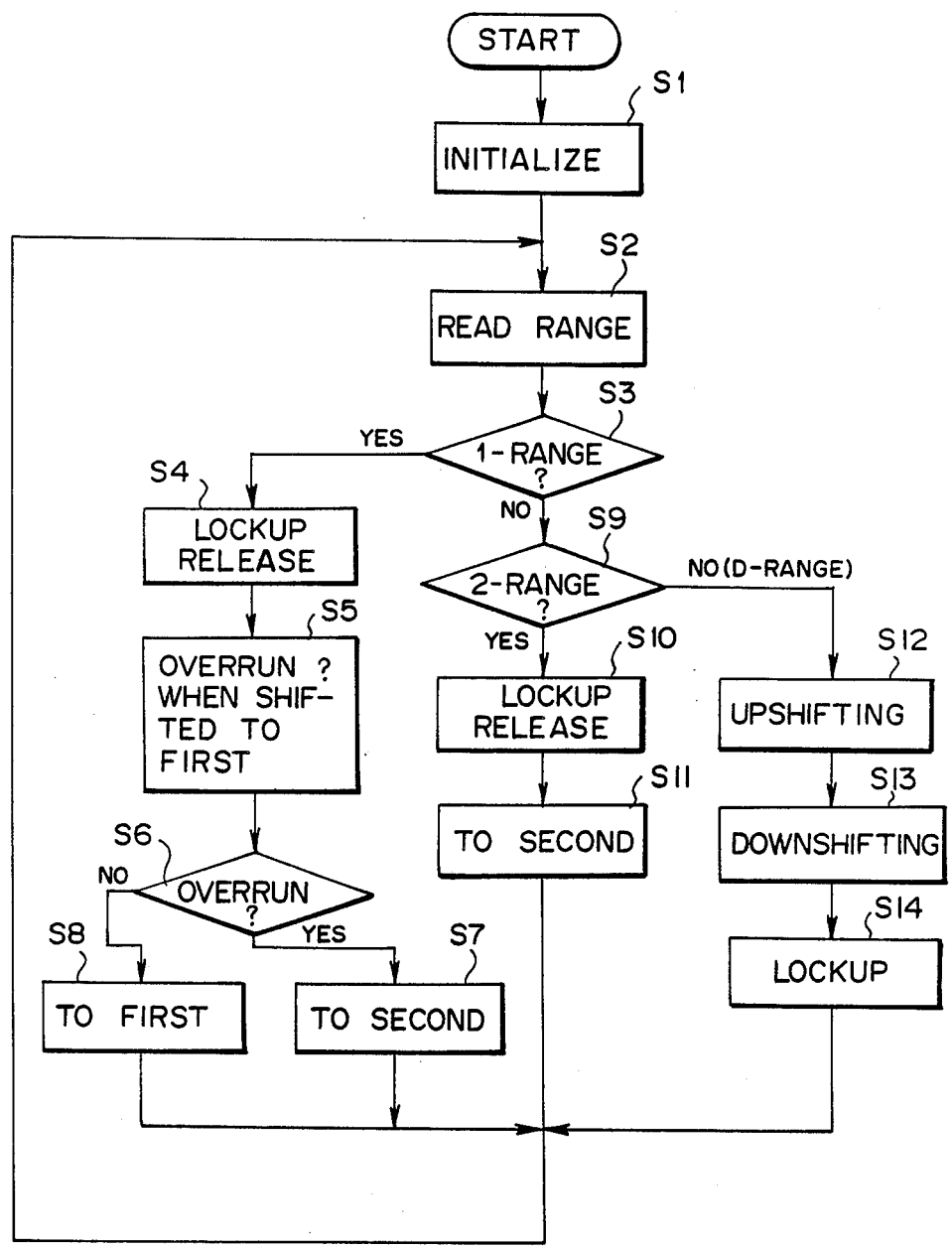
FIG. 4 is a general flow chart showing the operation to be accomplished by an automatic transmission control system in accordance with an embodiment of the present invention.

FIG. 4 shows the general flow chart of the gear-shifting control. Initialization is first accomplished in step S1. In the initialization, the ports of each control valve for switching the hydraulic control circuit of the automatic transmission and required counters are initialized so that the transmission gear mechanism 20 is set to first gear and the lockup clutch 15 is released, and then each working area of the control unit 200 is initialized.

In step S2, the position of the selector valve 103 or the selected driving range is read. In step S3, it is determined whether or not the selected driving range is 1-range. When it is determined that the selected driving range is 1-range in the step S3, the lockup is released in step S4. Thereafter, it is calculated whether or not the engine will overrun if the downshift to first gear takes place in step S5. When it is determined that the engine will overrun in step S6, the solenoid valves are controlled to shift the transmission gear mechanism 20 to second gear in step S7. Otherwise, the transmission gear mechanism 20 is shifted to first gear in step S8.

When it is not determined that the selected driving range is 1-range in the step S3, it is determined whether or not the selected driving range is 2-range in step S9. When it is determined that the selected driving range is 2-range in the step S9, the lockup is released in step S10 and then the transmission gear mechanism 20 is shifted to second gear in step S11. When it is not determined that the selected driving range is 2-range in the step S9, the selected driving range is considered to be D-range and the upshifting control, the downshifting control and the lockup control are successively accomplished in steps S12 to S14.

After the step S7, S8, S11 or S14, the control unit returns to the step S2 and repeats the routine described above.

Upshifting Control

Figure 5:
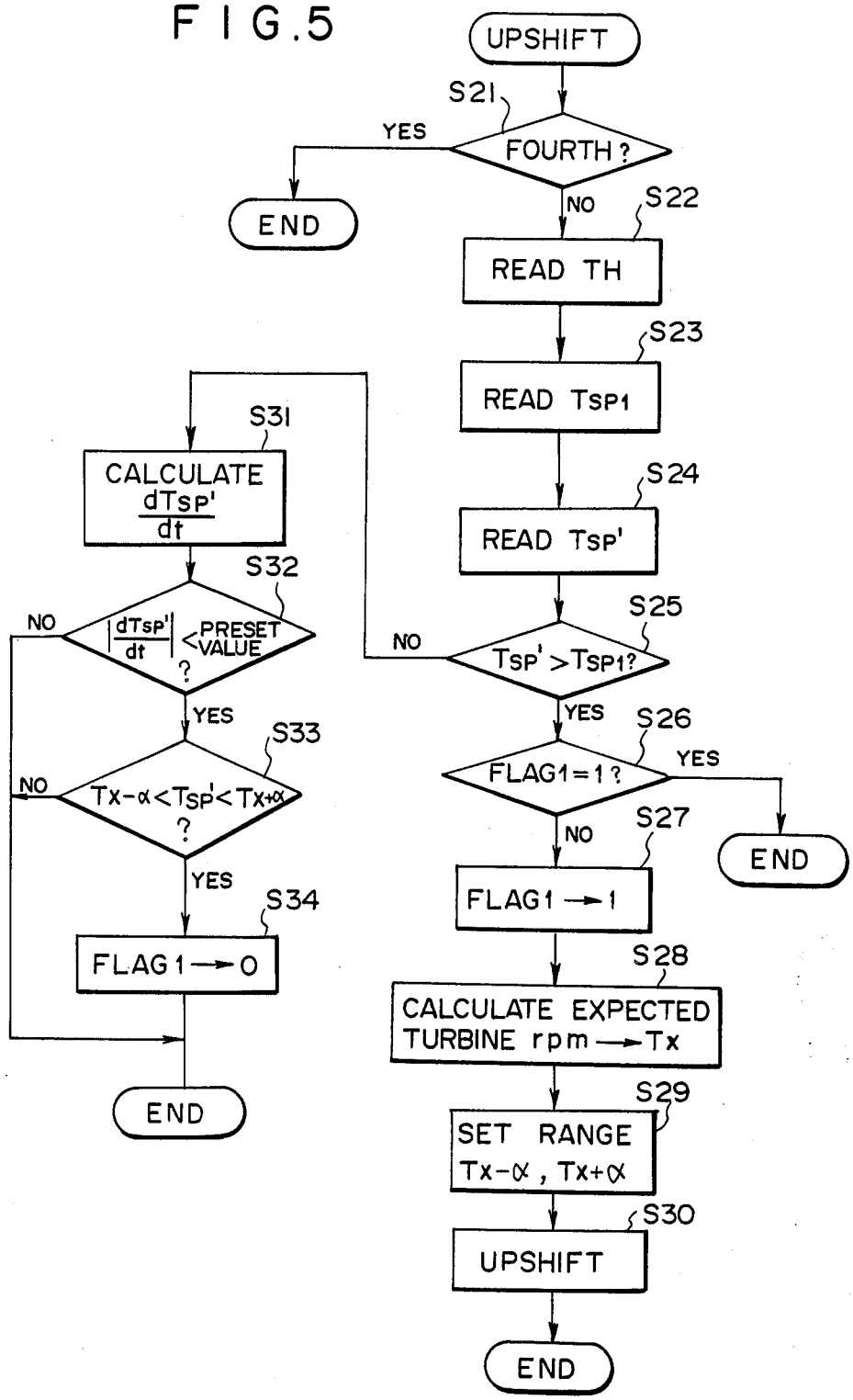
FIG. 5 is a flow chart showing in detail the operation to be accomplished in the step S12 in FIG. 4.

The upshifting control to be accomplished in the step S12 in FIG. 4 will be described in detail with reference to FIG. 5.

In step S21, the position of the gear is read out and whether the transmission gear mechanism 20 is in fourth gear is determined. When it is not determined that the transmission gear mechanism 20 is in fourth gear, the actual throttle opening degree TH is read out in step S22 and the data Tsp1 of an upshift map corresponding to the actual throttle opening degree TH is read out in step S23. An example of the upshift map is shown in FIG. 6. In step S24, the actual turbine rpm Tsp' is read out and, in step S25, the actual turbine rpm Tsp' is compared with the data Tsp1 read out in the step S23 representing the preset turbine rpm Tsp1 corresponding to the actual throttle opening degree TH with respect to a shifting line Mful, and it is determined whether or not the former is larger than the latter.

When it is determined that the actual turbine rpm Tsp' is larger than the preset turbine rpm Tsp1 in the step S25, a flag "1" for upshift by one speed is read out and it is determined whether the read-out flag "1" is 1 or 0, that is, whether the read-out flag "1" is the set state or the reset state in step S26. The flag "1" is changed from 0 to 1 when upshift by one speed is effected, and when the flag "1" is in the reset state, the flag "1" is set to 1 in step S27. Thereafter, a process for determining that the gear-shifting is completed (to be described later) is effected in steps S28 and S29, and upshift by one speed is accomplished in step S30, and the upshifting control is completed.

When it is determined that the flag "1" is 1 in the step S26, the control is immediately ended. Similarly, when it is determined that the transmission gear mechanism 20 is in fourth gear, the control is immediately ended.

In said step S28, the turbine rpm TX at which the turbine is expected to rotate after upshift by one speed is calculated on the basis of the actual turbine rpm Tsp'. This calculation is made taking into account the gear ratios before and after the upshift, and the expected turbine rpm TX is obtained by multiplying the actual turbine rpm or the turbine rpm upon the upshift Tsp' by the value obtained by dividing the gear ratio after the upshift by the gear ratio before the upshift. For example, when it is assumed that upshift from third to fourth is to be effected and the actual turbine rpm Tsp' is 5000 rpm, the expected turbine rpm TX will be 3425 rpm, that is, 5,000×0.685/1.000=3,425 (See Table 3). In the step S29, an expected turbine rpm range is set to afford a margin for error by adding and subtracting a predetermined rpm deviation α to and from the expected turbine rpm TX. The rpm deviation α is determined taking into account the fact that the turbine rpm after the upshift may deviate from the calculated value depending upon the operating condition, especially the amount of depression of the accelerator pedal. The value of α should be minimized within a range in which the expected deviation from the calculated value can be accommodated. In this particular embodiment, the rpm deviation α is obtained by dividing the product of the actual turbine rpm Tsp' and (1−the gear ratio after upshift/the gear ratio before downshift) by 4. For example, when it is assumed that upshift from third to fourth is to be effected and the actual turbine rpm Tsp' is 5000 rpm, the rpm deviation α will be 394 rpm, that is, 5,000×(1−0.685/1.000)/4=394. Accordingly, when the calculated value of the expected turbine rpm TX is 3425 rpm, the expected turbine rpm range will be from 3031 to 3819 rpm.

When it is not determined that the actual turbine rpm Tsp' is larger than the preset turbine rpm Tsp1 in the step S25, the rate of change in the turbine rpm dTsp'/dt is calculated in step S31. Then, in step S32, it is determined whether the absolute value of the calculated value of the rate of change in the turbine rpm dTsp'/dt is smaller than a preset value. The rate of change represents the reducing tendency of the turbine rpm and the preset value is determined taking into account the degree of the reducing tendency of the turbine rpm expected during the upshift. That is, when the absolute value of the rate of change in the turbine rpm dTsp'/dt is larger than the preset value, it can be considered that the upshift is being effected. The preset value may differ from one upshift to another, and may be determined to be, for instance, a half of the detected maximum value of the rate of change in the turbine rpm (the absolute value).

When it is determined that the absolute value of the rate of change in the turbine rpm dTsp'/dt is smaller than the preset value in the step S32, it is determined, in step S33, whether the actual turbine rpm Tsp' (the present value of the turbine rpm) is within the expected turbine rpm range TX−α−TX+α set in the step S29, and when it is determined that the actual turbine rpm Tsp' is within the range, the flag "1" is set to 0 in step S34.

When it is not determined that the absolute value of the rate of change in the turbine rpm dTsp'/dt is smaller than the preset value, or when it is not determined that the actual turbine speed Tsp' is within the range, it is considered that the upshift is being effected and the control is ended without setting the flag "1" to 0.

Downshifting Control

Figure 7:
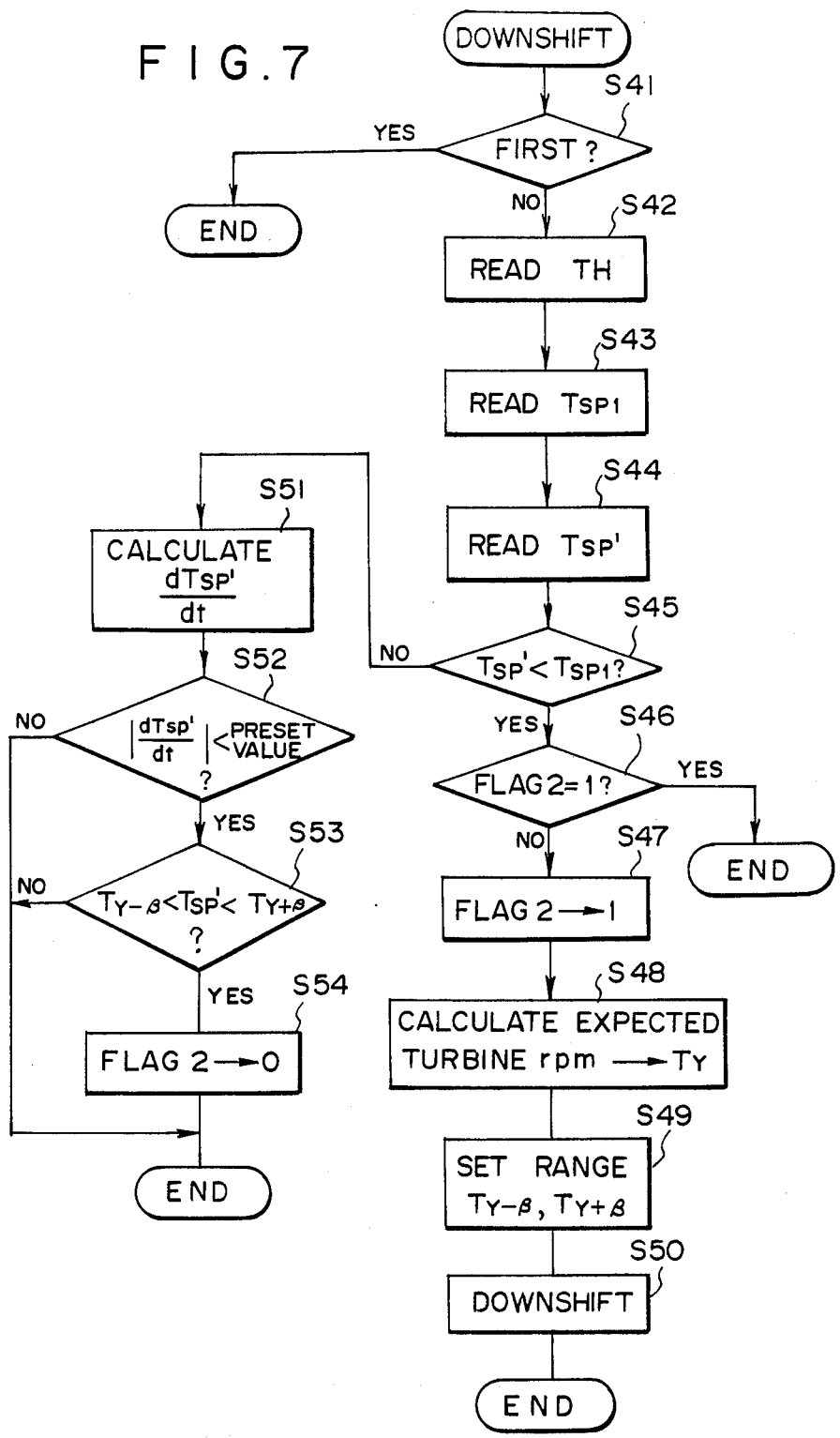
FIG. 7 is a flow chart showing in detail the operation to be accomplished in the step S13 in FIG. 4.

The downshifting control to be accomplished in the step S13 in FIG. 4 will be described in detail with reference to FIG. 7.

In step S41, the position of the gear is read out and it is determined whether the transmission gear mechanism 20 is in first gear. When it is not determined that the transmission gear mechanism 20 is in first gear, the actual throttle opening degree TH' is read out in step S42 and the data Tsp1 of an downshift map corresponding to the actual throttle opening degree TH is read out in step S43. An example of the downshift map is shown in FIG. 8. In step S44, the actual turbine rpm Tsp' is read out and, in step S45, the actual turbine rpm Tsp' is compared with the data Tsp1 read out in the step S43 representing the preset turbine rpm Tsp1 corresponding to the actual throttle opening degree TH' with respect to a shifting line Mfd1, and it is determined whether the former is smaller than the latter.

When it is determined that the actual turbine rpm Tsp' is smaller than the preset turbine rpm Tsp1 in the step S45, a flag "2" for downshift by one speed is read out and it is determined whether the read-out flag "2" is 1 or 0, that is, whether the read-out flag "2" is the set state or the reset state in step S46. The flag "2" is changed from 0 to 1 when downshift by one speed is effected, and when the flag "2" is in the reset state, the flag "2" is set to 1 in step S47. Thereafter, a process for determining that the gear-shifting is completed (to be described later) is effected in steps S48 and S49, and downshift by one speed is accomplished in step S50, and the downshifting control is completed.

When it is determined that the flag "2" is 1 in the step S46, the control is immediately ended. Similarly, when it is determined that the transmission gear mechanism 20 is in first gear, the control is immediately ended.

In said step S48, the turbine rpm TY at which the turbine is expected to rotate after downshift by one speed is calculated on the basis of the actual turbine rpm Tsp'. This calculation is made taking into account the gear ratios before and after the downshift, and the expected turbine rpm TY is obtained by multiplying the actual turbine rpm or the turbine rpm upon the downshift Tsp' by the value obtained by dividing the gear ratio after the downshift by the gear ratio before the downshift. For example, when it is assumed that downshift from fourth to third is to be effected and the actual turbine rpm Tsp' is 3000 rpm, the expected turbine rpm TY will be 4380 rpm, that is, 3,000×1.000/0.685=4,380 (See table 3). In the step S49, an expected turbine rpm range is set to afford a margin for error by adding and subtracting a predetermined rpm deviation β to and from the expected turbine rpm TY. The rpm deviation β is determined in a similar as the rpm deviation α in the upshifting control. In this particular embodiment, the rpm deviation β is obtained by dividing by 4 the product of the actual turbine rpm Tsp' and (the gear ratio after downshift/the gear ratio before downshift −1). For example, when it is assumed that downshift from fourth to third is to be effected and the actual turbine rpm Tsp' is 3000 rpm, the rpm deviation β will be 344 rpm, that is, 3,000×(0.685/1.000−1)/4=344. Accordingly, when the calculated value of the expected turbine rpm TY is 4380 rpm, the expected turbine rpm range will be from 4036 to 4724 rpm.

When it is not determined that the actual turbine rpm Tsp' is smaller than the preset turbine rpm Tsp1 in the step S45, the rate of change in the turbine rpm dTsp'/dt is calculated in step S51. Then, in steps S52 and S53, determinations similar to in the steps S32 and S33 in the upshifting control are made, and when the rate of change in the turbine rpm is smaller than the preset value and the actual turbine rpm is within the range, it is considered that the downshift is completed and the flag "2" is set to 0.

Lockup Control

Figure 9:
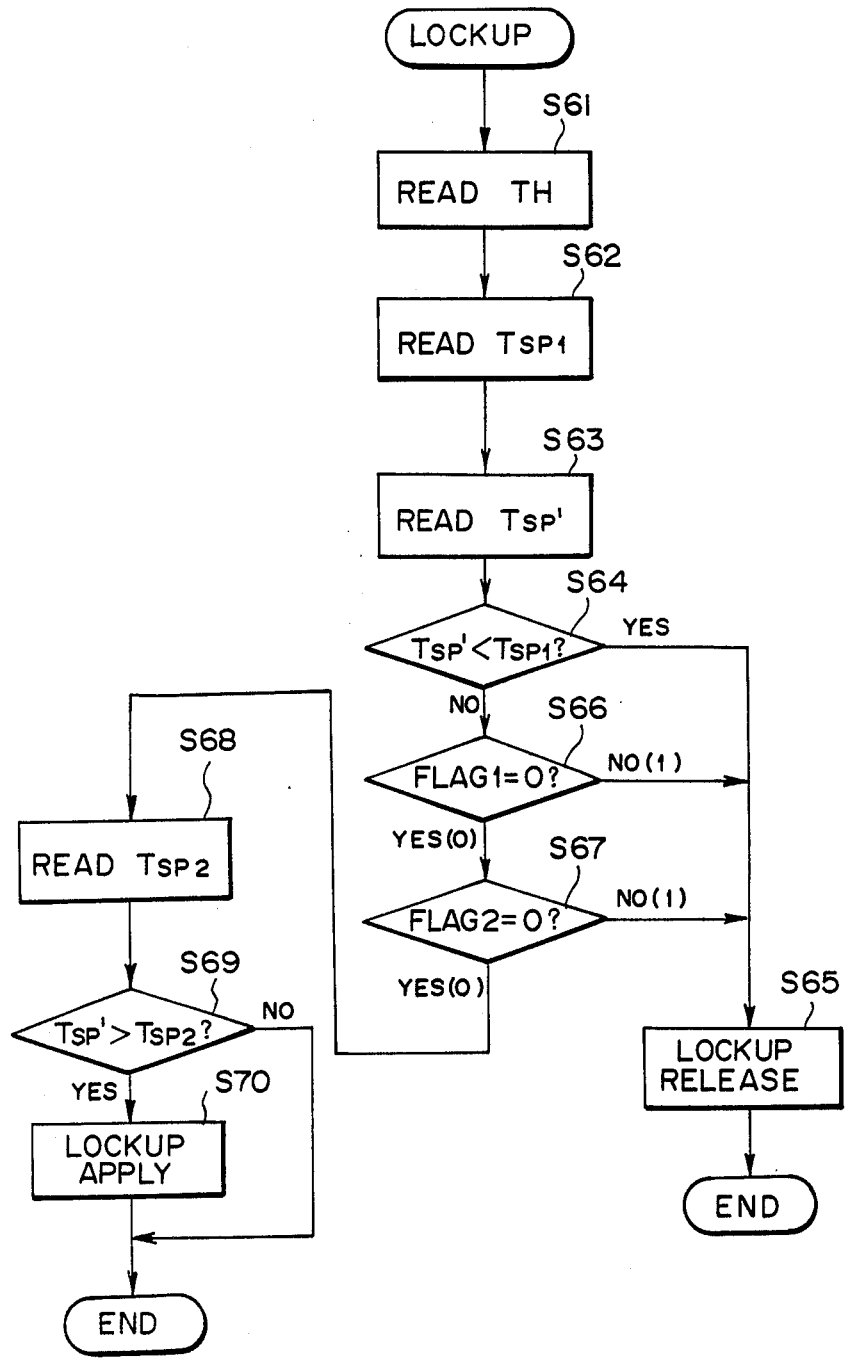
FIG. 9 is a flow chart showing in detail the operation to be accomplished in the step S14 in FIG. 4.

The lockup control to be accomplished in the step S14 in FIG. 4 will be described in detail with reference to FIG. 9. In step S61, the actual throttle opening degree TH is read out and a preset turbine from Tsp1 corresponding to the actual throttle opening degree TH' is read out from a gear-shifting curve Moff for use in controlling the lockup release (See FIG. 10) in step S62. In step S63, the actual or present turbine rpm Tsp' is read out and, in step S64, the actual turbine rpm Tsp' is compared with the preset turbine rpm Tsp1 read out in the step S62, and it is determined whether the former is larger than the latter.

When it is determined that the actual turbine rpm Tsp' is larger than the preset turbine rpm Tsp1 in the step S64, it is determined whether gear-shifting is being effected in steps S66 and S67. This determination is accomplished by determining whether the flag "1" in the upshifting control described above is 0, and whether the flag "2" in the downshifting control described above is 0. When it is determined that the flag "1" or "2" is not 0, it is considered that gear-shifting is being effected and the lockup is released in step S65.

When it is determined that both the flag "1" and "2" are 0 in the steps S66 and S67, i.e., when gear-shifting is not being effected, a preset turbine rpm Tsp2 corresponding to the actual throttle opening degree TH' is read out from a gear-shifting curve Mon for use in controlling the lockup application (See FIG. 10) in step S68. In step S69, the actual turbine rpm Tsp' is compared with the preset turbine rpm Tsp2 read out in the step S68, and it is determined whether the former is larger than the latter. When it is determined that the former is larger than the latter, the lockup is applied in step S70 and then the control is ended. Otherwise, the control is immediately ended.

Figure 11:
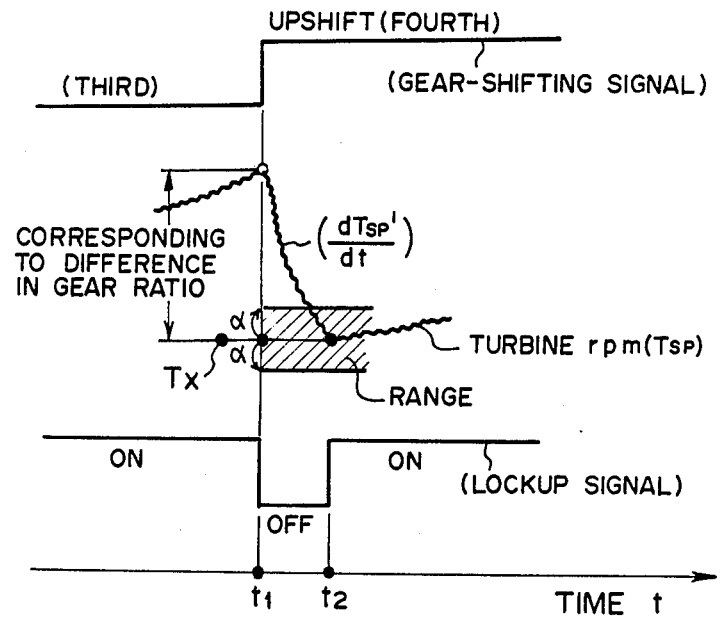
FIG. 11 is a view showing relations between the gear-shifting signal, the turbine rpm and the lockup signal upon an upshift.
Figure 12:
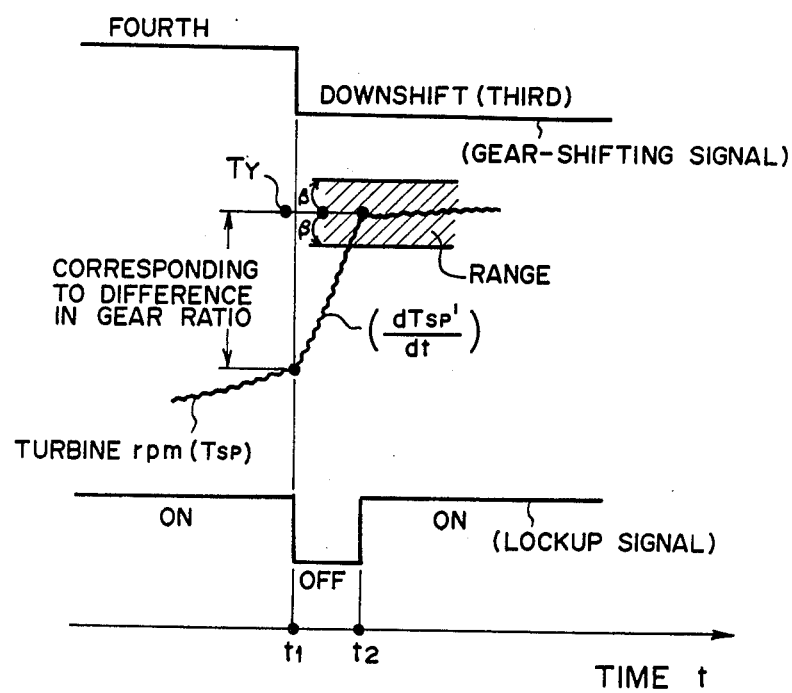
FIG. 12 is a view showing relations between the gear-shifting signal, the turbine rpm and the lockup signal upon a downshift.
Figure 13:
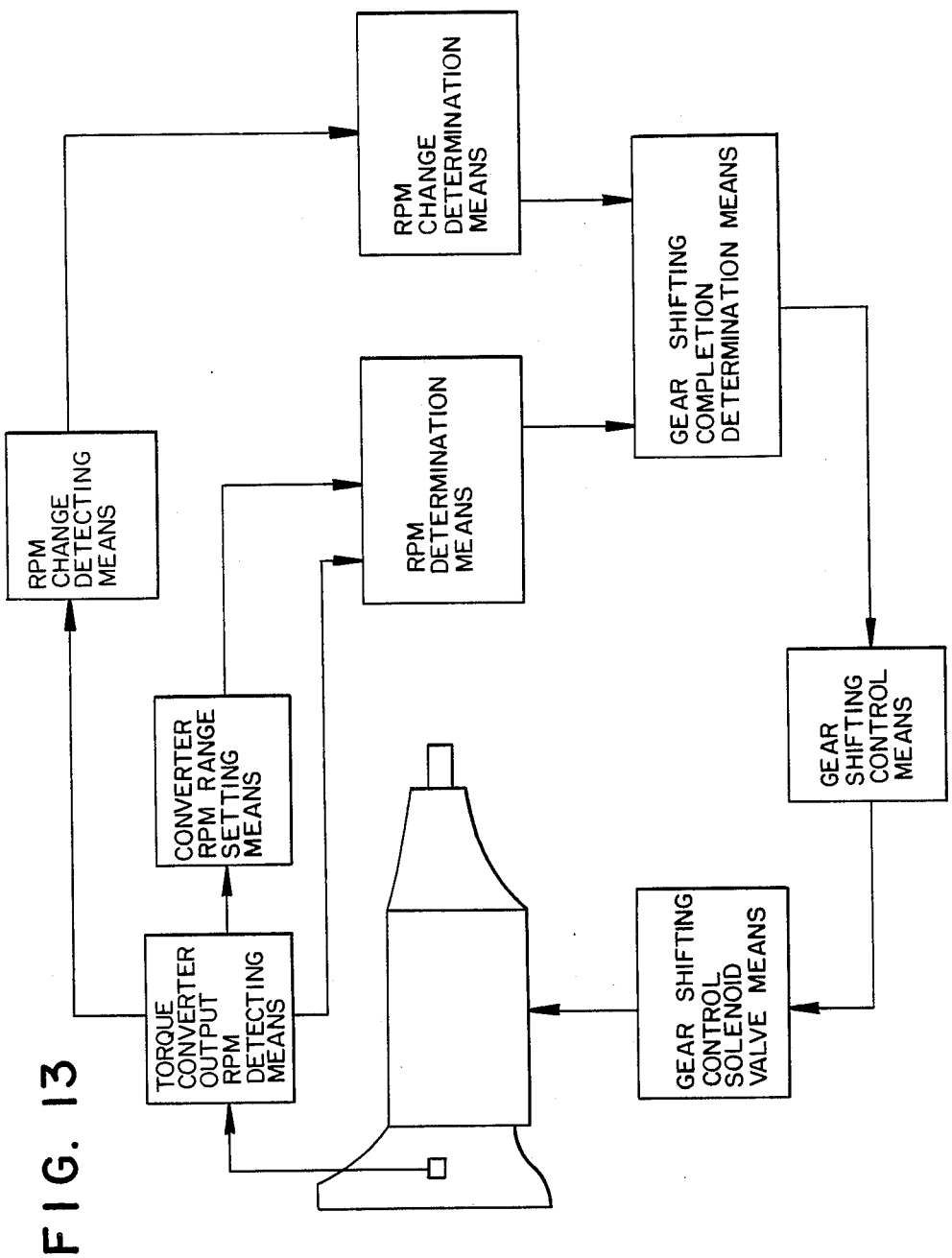
FIG. 13 is schematic view showing an automatic transmission control system in accordance with the present invention.

The relations between the gear-shifting signal, the turbine rpm and the lockup signal upon an upshift are shown in FIG. 11 and the relations between the gear-shifting signal, the turbine rpm and the lockup signal upon a downshift are shown in FIG. 12. In FIGS. 11 and 12, for the purpose of simplicity, delay in response of the oil pressure circuit and the like are ignored. Reference character t1 represents the time at which gear-shifting is started and reference character t2 represents the end of the gear-shifting.

In the case that the control unit 200 is a microcomputer, the microcomputer may be either a digital type or an analogue type.

We claim:

1. An automatic transmission control system comprising
   a torque converter connected to the engine output shaft,
   a transmission gear mechanism connected to the output shaft of the torque converter,
   a gear-shifting control means which controls, according to predetermined gear-shifting characteristics, feed of pressure fluid to a fluid actuator for accomplishing gear-shifting in the transmission gear mechanism,
   a torque converter output rpm detecting means which detects the rpm of the output shaft of the torque converter,
   a converter rpm range setting means for determining a range of the rpm of the output shaft of the torque converter corresponding to the completion of said gear-shifting as a function of the rpm of the output shaft of the torque converter upon initiation of said gear-shifting and gear positions of the transmission gear mechanism before and after said gears-shifting,
   an rpm change detecting means which detects the rate of change in the rpm of the output shaft of the torque converter,
   an rpm determination means which determines whether the rpm of the output shaft of the torque converter is within said rpm range determined by the converter rpm range setting means,
   an rpm change determination means which determines whether the rate of change in the rpm of the output shaft of the torque converter is smaller than a preset value, and
   a gear-shifting completion determining means which receives outputs from the rpm determination means and the rpm change determination means and determines whether the gear-shifting is completed.

2. An automatic transmission control system as defined in claim 1 in which said gear-shifting control means comprises solenoid valves for gear-shifting and an electronic control section for delivering a gear-shifting signal to the solenoid valves.

3. An automatic transmission control system as defined in claim 2 in which said electronic control section outputs a gear-shifting starting signal upon receipt of a signal from the gear-shifting completion determining means.

4. An automatic transmission control system as defined in claim 2 in which gear-shifting is accomplished according to predetermined engine load-torque converter output rpm chracteristics.

5. An automatic transmission control system as defined in claim 1 in which said converter rpm range setting means calculates the rpm TX of the output shaft of the torque converter corresponding to said completion of the gear shifting according to the following formula $TX = Tsp' \times$ gear ratio after gear-shifting/gear ratio before gear-shifting wherein Tsp' represents the rpm of the output shaft of the torque converter upon initiation of the gear-shifting.

6. An automatic transmission control system as defined in claim 5 in which said converter rpm range setting means determines the rpm range by adding and subtracting an rpm deviation $\alpha$ to and from the rpm TX of the output shaft of the torque converter, wherein the rpm deviation $\alpha$ is defined as $\alpha = Tsp' \times (1 - $ gear ratio after gear-shifting/gear ratio before gear-shifting).

7. An automatic transmission control system as defined in claim 1 in which said preset value differs from one gear-shifting to another.

8. An automatic transmission control system as defined in claim 1 in which said preset value changes depending upon the detected maximum value of the rate of change in the rpm of the output shaft of the torque converter.

9. An automatic transmission control system comprising
   a torque converter connected to the engine output shaft,
   a transmission gear mechanism connected to the output shaft of the torque converter,
   a gear-shifting control solenoid valve means which controls feed of pressure fluid to a fluid actuator for accomplishing gear-shifting in the transmission gear mechanism,
   a gear-shifting control means which delivers an upshifting signal or a downshifting signal to the gear-shifting control solenoid valve means according to predetermined gear-shifting characteristics,
   a lockup mechanism for directly connecting the engine output shaft to the output shaft of the torque converter,
   a torque converter output rpm detecting means which detects the rpm of the output shaft of the torque converter,
   a converter rpm range setting means for determining a range of the rpm of the output shaft of the torque converter corresponding to the completion of said gear-shifting and gear positions of the transmission gear mechanism before and after said gear-shifting,
   an rpm change determination means which determines whether the rate of change in the rpm of the output shaft of the torque converter is smaller than a preset value, an rpm determination means which determines whether the rpm of the output shaft of the torque converter is within said rpm range determined by the converter rpm range setting means, and a gear-shifting completion determining means which receives outputs from the rpm determination means and the rpm change determination means and determines whether the gear-shifting is completed, and said lockup mechanism releasing the lockup upon generation of the upshifting signal or the downshifting signal and applying the lockup upon receipt of a signal from the gear-shifting completion determining means.

10. An automatic transmission control system as defined in claim 9 said lockup mechanism is arranged to release the lockup upon generation of the upshifting signal or the downshifting signal and to apply the lockup upon receipt of a signal from the gear-shifting completion determining means.

11. An automatic transmission control system as defined in claim 9 in which said lockup mechanism is controlled according to predetermined engine load-torque converter output rpm characteristics.

12. An automatic transmission control system as defined in claim 11 in which gear-shifting is accomplished according to predetermined engine load-torque converter output rpm characteristics.

13. An automatic transmission control system as defined in claim 9 in which said converter rpm range setting means calculates the rpm TX of the output shaft of the torque converter corresponding to said completion of the gear shifting according to the following formula $$TX = Tsp' \times \text{gear ratio after gear-shifting/gear ratio before gear-shifting}$$

wherein $Tsp'$ represents the rpm of the output shaft of the torque converter upon initiation of the gear-shifting.

14. An automatic transmission control system as defined in claim 13 in which said converter rpm range setting means determines the rpm range by adding and subtracting an rpm deviation $\alpha$ to and from the rpm TX of the output shaft of the torque converter, wherein the rpm deviation $\alpha$ being defined as $\alpha = Tsp' \times (1 - \text{gear ratio after gear-shifting/gear ratio before gear-shifting})$.

15. An automatic transmission control system as defined in claim 9 in which said preset value differs from one gear-shifting to another.

16. An automatic transmission control system as defined in claim 9 in which said preset value changes depending upon the detected maximum value of the rate of change in the rpm of the output shaft of the torque converter.

* * * * *